(No Model.) 2 Sheets—Sheet 2.
L. OLMSTED.
FRUIT GATHERER.
No. 493,287. Patented Mar. 14, 1893.

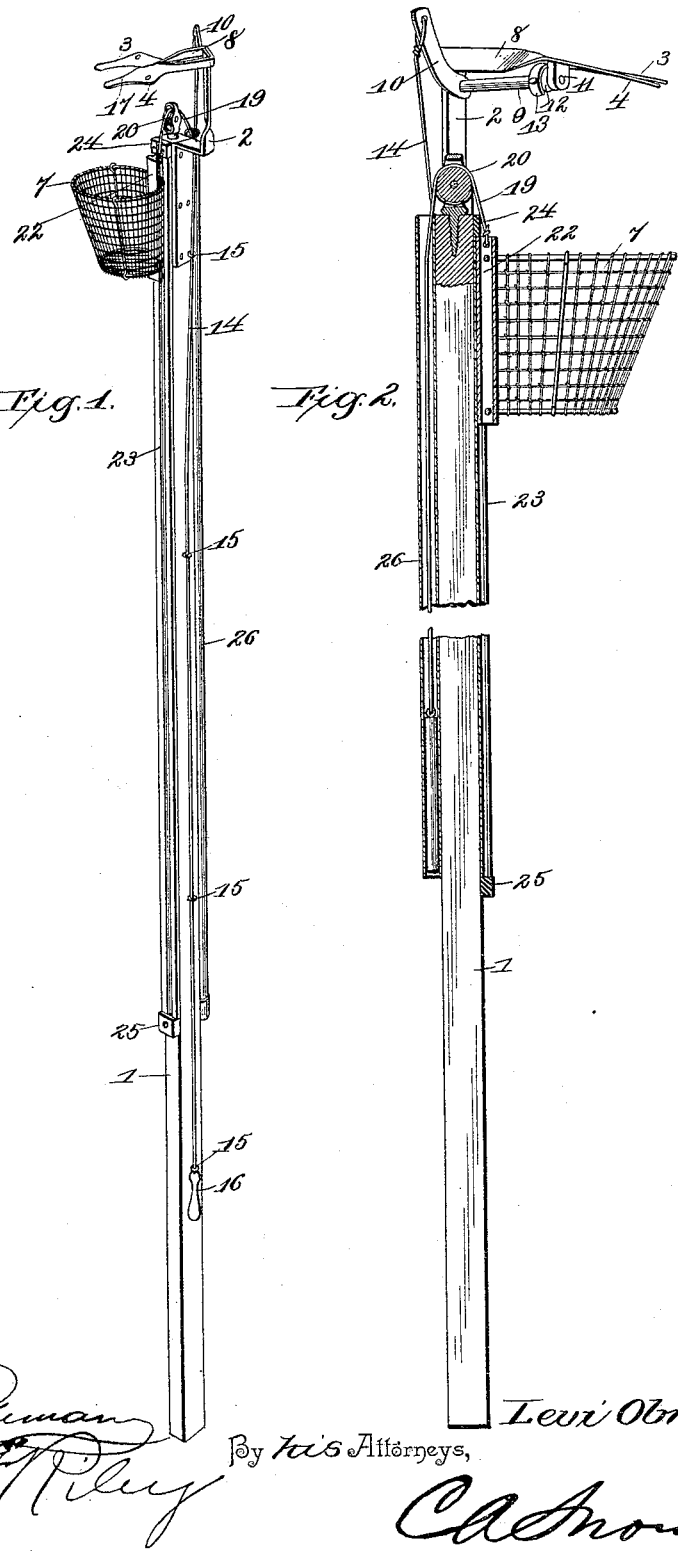

Witnesses  Inventor
  Levi Olmsted
By his Attorneys,

UNITED STATES PATENT OFFICE.

LEVI OLMSTED, OF JERSEY SHORE, PENNSYLVANIA, ASSIGNOR OF TWO-THIRDS TO JAMES STARK, JR., AND WILLIAM A. SELTS, OF SAME PLACE.

FRUIT-GATHERER.

SPECIFICATION forming part of Letters Patent No. 493,287, dated March 14, 1893.

Application filed July 30, 1892. Serial No. 441,724. (No model.)

*To all whom it may concern:*

Be it known that I, LEVI OLMSTED, a citizen of the United States, residing at Jersey Shore, in the county of Lycoming and State of Pennsylvania, have invented a new and useful Fruit-Gatherer, of which the following is a specification.

The invention relates to improvements in fruit-gatherers.

The object of the present invention is to improve the construction of fruit-gatherers, and to provide one which will readily sever the fruit and convey the same to the operator, and return the basket to the top of the pole automatically.

The invention consists in the construction and novel combination and arrangement of parts hereinafter fully described, illustrated in the accompanying drawings, and pointed out in the appended claims.

Figure 3:
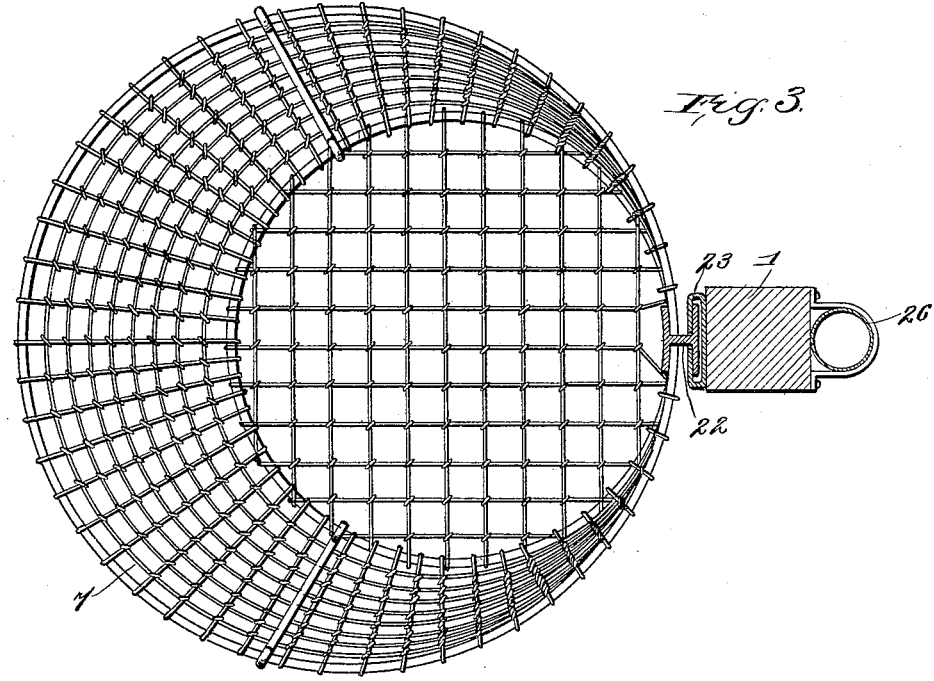
Figure 4:
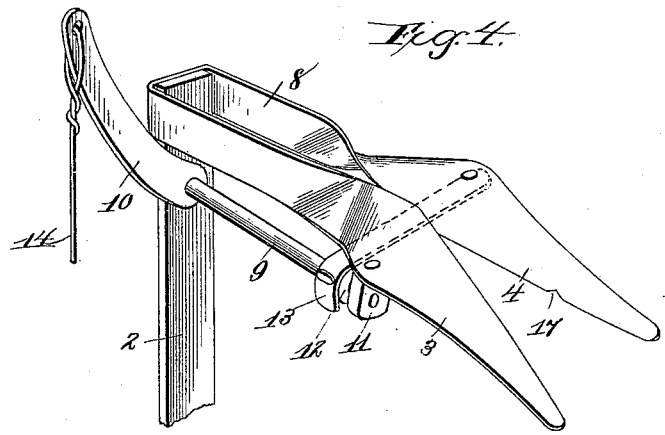

In the drawings: Figure 1 is a perspective view of a fruit-gatherer constructed in accordance with this invention. Fig. 2 is a longitudinal sectional view. Fig. 3 is a transverse sectional view. Fig. 4 is a detail perspective view of the shears.

Like numerals of reference indicate like parts in all the figures.

1 designates a pole, having secured to its upper end a metal bar 2, which is bent outwardly at the top of the pole and upwardly so as to bring the blades 3 and 4 of shears which are secured to the upper end of the bar, directly over a basket 7, whereby fruit severed by the shears will drop into the basket. The shears consist of spring-actuated blades formed integral with an approximately rectangular shank 8, and the blades are drawn together for cutting by a rock-shaft 9, provided with an arm 10, and having one end journaled in a perforation of the bar 2, and having its other end journaled in a perforated lug 11, depending from the lower face of the blade 3. The rock-shaft is provided near its outer end with a collar 12, to which is secured one end of a resilient metal strap 13, which has its other end secured to the lower face of the blade 4, whereby when the rock-shaft is turned by its arm being drawn downward, the resilient metal strap will be partially wound on the collar, thereby causing the blades of the shears to close. After the stem of the fruit is cut, the blades are opened by the action of their shank, with the assistance of the resilient strap. The rock-shaft is operated by means of a wire 14, which extends downward along the pole and is arranged in guide-eyes 15, and is provided at its lower end with a handle 16. The arm and collar of the rock-shaft are, preferably, formed integral therewith. The blade 4, is provided, intermediate of its ends, with a notch 17, which forms a stop to prevent the blades entirely closing and to avoid straining the springs, and to make the operation of the device easier. The blades have their outer portions crossing each other adjacent to the notch, as best seen in Figs. 2, so that the blade 3 will strike the notch of the blade 4. The basket 7, is attached to one end of a cord or rope 19, which passes around a cap-pulley 20, and which has its other end provided with a cylindrical weight 21, heavier than the basket, whereby, when the basket is empty, the weight will cause the same to rise to the top of the pole; but when the basket is filled or partially filled with fruit, its weight increased by its contents will be heavier than the weight 21, and it will, therefore, descend to within easy reach of the operator. After the fruit has been removed, the weight will draw the basket to the top of the pole. By varying the weight 21, the amount of fruit necessary to cause the basket to descend can be regulated. The basket is provided with a vertical slide 22, approximately T-shaped in cross-section, and having two of its coincident flanges arranged within a sheet-metal guide or way 23. The sheet-metal guide or way consists of a strip of metal having its longitudinal edges bent inward on the body of the metal to provide oppositely-disposed grooves. Stops 24 and 25 are arranged at the top and bottom of the guide or way to prevent the slide leaving the same, and the upper stop, 24, is provided with a groove to receive the rope or cord. The weight 21 is arranged within and guided by a tube 26, secured to the pole on the side opposite that having the guide or way. The cap-pulley at the top of the pole prevents the cord from leaving it and becoming caught or tangled.

It will be seen that the fruit-gatherer is simple and comparatively inexpensive in construction, and that it is automatic in its operation in conveying fruit from the top of the pole to the operator and in returning the basket to the top of the pole.

What I claim is—

1. In a fruit-gatherer, the combination of a pole, shears mounted at the top of the pole, a rock-shaft journaled at the top of the pole and having one end mounted on one of the blades of the shears and provided with an arm and having a collar, a resilient metal strap secured to the other blade of the shears and attached to the collar and adapted to be wound around the same, and connections between the arm and the lower portion of the pole, substantially as described.

2. In a fruit-gatherer, the combination of a pole, a bar secured to the top of the pole and having its upper portion bent upwardly and outwardly, shears secured to the upper end of the bar and having one of its blades provided with a depending perforated lug, a rock-shaft journaled in the perforated lug and on the bar and provided with a collar arranged beneath the blade having the lug, a resilient metal strap secured to the other blade and attached to the collar and adapted to be wound around the latter, an arm extending from the rock-shaft, and connections between the arm and the lower portion of the pole, substantially as described.

3. In a fruit-gatherer, the combination, of a pole, shears mounted at the top of the pole and having one of its blades provided with a stop to limit the closing of the same, a rock-shaft arranged at the top of the pole and having one end journaled on one of the blades, a resilient strap connected to the other blade, a collar arranged on the rock-shaft and having the resilient strap secured to it, and means for turning the rock-shaft to close the blades, substantially as described.

4. In a fruit-gatherer, the combination of a pole, provided at the upper end with a pulley, a sheet-metal guide arranged at one side of the pole and having its longitudinal edges bent inward on its outer face to provide grooves, a longitudinally disposed tube arranged at the opposite side of the pole, a stop arranged at each end of the guide, a cord passing around the pulley, a basket attached to one end of the rope and provided with a flanged slide engaging the grooves of the guide, and cylindrical weight attached to the other end of the cord and arranged in the tube, substantially as described.

In testimony that I claim the foregoing as my own I have hereto affixed my signature in the presence of two witnesses.

LEVI OLMSTED.

Witnesses:
WM. R. PEOPLES,
C. S. LEMON.